United States Patent
Greenberger et al.

(10) Patent No.: US 12,412,184 B2
(45) Date of Patent: Sep. 9, 2025

(54) PHYSICAL PRODUCT INTERACTION BASED SESSION

(71) Applicant: International Business Machines Corporation, Armonk, NY (US)

(72) Inventors: Jeremy A. Greenberger, San Jose, CA (US); Zachary Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 822 days.

(21) Appl. No.: 15/870,324

(22) Filed: Jan. 12, 2018

(65) Prior Publication Data

US 2019/0220871 A1  Jul. 18, 2019

(51) Int. Cl.
*G06Q 30/0201* (2023.01)
*G06F 3/01* (2006.01)
*G06F 7/08* (2006.01)
*G06Q 30/0202* (2023.01)

(52) U.S. Cl.
CPC ......... *G06Q 30/0201* (2013.01); *G06F 3/017* (2013.01); *G06F 7/08* (2013.01); *G06Q 30/0202* (2013.01)

(58) Field of Classification Search
CPC ........... G06Q 30/0643; G06Q 30/0251; G06Q 30/0261; G06Q 30/02; G06Q 30/0631; G06Q 30/0277
See application file for complete search history.

(56) References Cited

U.S. PATENT DOCUMENTS

| | | | |
|---|---|---|---|
| 6,931,254 B1 * | 8/2005 | Egner | H04W 4/021 455/456.3 |
| 8,009,863 B1 | 8/2011 | Sharma et al. | |
| 8,103,531 B2 | 1/2012 | Wollan | |
| 8,281,256 B2 | 10/2012 | Nelson et al. | |
| 8,762,292 B2 | 6/2014 | Bright et al. | |
| 9,177,451 B2 | 11/2015 | Calman et al. | |
| 9,189,792 B2 | 11/2015 | Butler et al. | |

(Continued)

OTHER PUBLICATIONS

Collins, Chris. A Brief History of XML. Mar. 3, 2008 (Year: 2008).*

(Continued)

*Primary Examiner* — Johnna R Loftis
(74) *Attorney, Agent, or Firm* — Elliot J. Shine, Esq.; Heslin Rothenberg Farley & Mesiti P.C.; George S. Blasiak, Esq.

(57) ABSTRACT

Methods, computer program products, and systems are presented. The method computer program products, and systems can include, for instance: obtaining product interaction data, the product interaction data being in dependence on a user's interaction with an item within a venue; examining, by machine logic, data of the product interaction data, wherein the examining includes examining of data of the product interaction data to determine that the user has interacted with the item; configuring, by machine logic, a webpage that specifies product information, wherein the configuring is based on the examining data of the product interaction data, and wherein the configuring is performed in response to a communication received from the user; and sending the configured webpage to the user.

13 Claims, 9 Drawing Sheets

(56) References Cited

U.S. PATENT DOCUMENTS

| | | | | |
|---|---|---|---|---|
| 2003/0225613 | A1* | 12/2003 | Shahoumian | G06Q 30/0255 705/14.53 |
| 2004/0002897 | A1 | 1/2004 | Vishik | |
| 2004/0044580 | A1* | 3/2004 | Haller | G07G 1/0036 705/17 |
| 2007/0100650 | A1* | 5/2007 | Ramer | G06F 16/68 705/26.1 |
| 2008/0088886 | A1* | 4/2008 | Silverbrook | G06F 3/0321 358/403 |
| 2011/0093344 | A1 | 4/2011 | Burke et al. | |
| 2011/0191157 | A1* | 8/2011 | Blackhurst | G06Q 40/02 705/14.25 |
| 2012/0143680 | A1* | 6/2012 | Hansen | G06Q 30/0248 705/14.47 |
| 2012/0143690 | A1* | 6/2012 | Hansen | G06Q 30/0261 705/14.58 |
| 2012/0226586 | A1* | 9/2012 | Paul | G06Q 30/06 705/26.61 |
| 2013/0030915 | A1* | 1/2013 | Statler | G06Q 20/322 705/14.54 |
| 2013/0090996 | A1* | 4/2013 | Stark | G06Q 30/02 705/14.4 |
| 2014/0136364 | A1* | 5/2014 | Gadre | G06Q 30/0641 705/26.8 |
| 2014/0146960 | A1* | 5/2014 | Williams | H04M 3/5238 379/265.09 |
| 2014/0164190 | A1* | 6/2014 | Schiffman | G06Q 30/0641 705/27.1 |
| 2014/0379480 | A1* | 12/2014 | Rao | G06Q 30/0261 705/14.58 |
| 2015/0081474 | A1* | 3/2015 | Kostka | H04W 88/08 705/26.8 |
| 2015/0317682 | A1* | 11/2015 | Kayser | G01G 19/42 705/14.55 |
| 2016/0086191 | A1* | 3/2016 | Fonzi | H04W 4/029 705/304 |
| 2016/0092961 | A1 | 3/2016 | Gopalsamy et al. | |
| 2016/0210682 | A1 | 7/2016 | Kannan et al. | |
| 2016/0267552 | A1 | 9/2016 | Chandra | |
| 2016/0292693 | A1* | 10/2016 | Marum | G06Q 30/0201 |
| 2017/0011127 | A1* | 1/2017 | Hu | G06F 16/9535 |
| 2017/0039587 | A1 | 2/2017 | Dey et al. | |
| 2017/0278137 | A1* | 9/2017 | Burke | G06F 16/784 |

OTHER PUBLICATIONS

Kim et al.; "Shop-i: Gaze Based Inetraction in the Physical World for In-Store Social Shopping Experience", CHI EA ACM 33rd Annual Conf. On, Apr. 18-23, 2015, pp. 1253-1258.

Inman et al.; "The Interplay Between Category Characteristics, Customer Characteristics . . . On In-Store Decision Making", Journal of Marketing, Sep. 2009, pp. 1-33.

Sarwat et al.; "PLUTUS: Leveraging Location-Based Social Networks to Recommend Potential Customers to Venues", MDM IEEE 14th Inter. Conf. On, vol. 1, Jun. 3-6, 2013, pp. 26-35.

* cited by examiner

PHYSICAL PRODUCT INTERACTION BASED SESSION

BACKGROUND

Many consumers use online information resources to conduct product research. A typical consumer may visit several electronic commerce websites as well as consult user reviews, forums, blogs (e.g., video blogs), and expert reviews (e.g. how to buy sites, product reviews). In addition, a consumer may also ask their friends and colleagues on their social network for opinions and information. Web search engines help consumers significantly in that they can be used to easily find information about products. However, it is often up to the consumers to bring all the information collected from several resources together and make sense from it. The amount of information available online about different products is plentiful and can sometimes be overwhelming for consumers.

Providers of electronic commerce websites are interested in identifying potential purchasers of their products and in directing these potential purchasers to their websites. Web search engines have served this implicit function by channeling keywords that online users searched to advertisement networks, where manufacturers and retailers bid on specific keywords in order to get the online users directed to their websites. This method does not necessarily have a high probability of resulting in purchases since people use web search engines for a variety of reasons and it is never certain that a user who is typing in a specific keyword is a likely buyer. Furthermore, web search engines do not provide much information about a user. A typical web search engine provides a location of the user based on an Internet protocol address, as well as websites previously visited by the user based on cookies. Thus, profiles of users as determined by web search engines are often shallow and do not contain enough information for segmenting potential purchasers.

SUMMARY

Shortcomings of the prior art are overcome, and additional advantages are provided, through the provision, in one aspect, of a method. The method can include, for example: methods, computer program products, and systems are presented. The method computer program products, and systems can include, for instance: obtaining product interaction data, the product interaction data being in dependence on a user's interaction with an item within a venue; examining, by machine logic, data of the product interaction data, wherein the examining includes examining of data of the product interaction data to determine that the user has interacted with the item; configuring, by machine logic, a webpage that specifies product information, wherein the configuring is based on the examining data of the product interaction data, and wherein the configuring is performed in response to a communication received from the user; and sending the configured webpage to the user.

In another aspect, a computer program product can be provided. The computer program product can include a computer readable storage medium readable by one or more processing unit and storing instructions for execution by one or more processor for performing a method. The method can include, for example: methods, computer program products, and systems are presented. The method computer program products, and systems can include, for instance: obtaining product interaction data, the product interaction data being in dependence on a user's interaction with an item within a venue; examining, by machine logic, data of the product interaction data, wherein the examining includes examining of data of the product interaction data to determine that the user has interacted with the item; configuring, by machine logic, a webpage that specifies product information, wherein the configuring is based on the examining data of the product interaction data, and wherein the configuring is performed in response to a communication received from the user; and sending the configured webpage to the user.

In a further aspect, a system can be provided. The system can include, for example a memory. In addition, the system can include one or more processor in communication with the memory. Further, the system can include program instructions executable by the one or more processor via the memory to perform a method. The method can include, for example: methods, computer program products, and systems are presented. The method computer program products, and systems can include, for instance: obtaining product interaction data, the product interaction data being in dependence on a user's interaction with an item within a venue; examining, by machine logic, data of the product interaction data, wherein the examining includes examining of data of the product interaction data to determine that the user has interacted with the item; configuring, by machine logic, a webpage that specifies product information, wherein the configuring is based on the examining data of the product interaction data, and wherein the configuring is performed in response to a communication received from the user; and sending the configured webpage to the user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
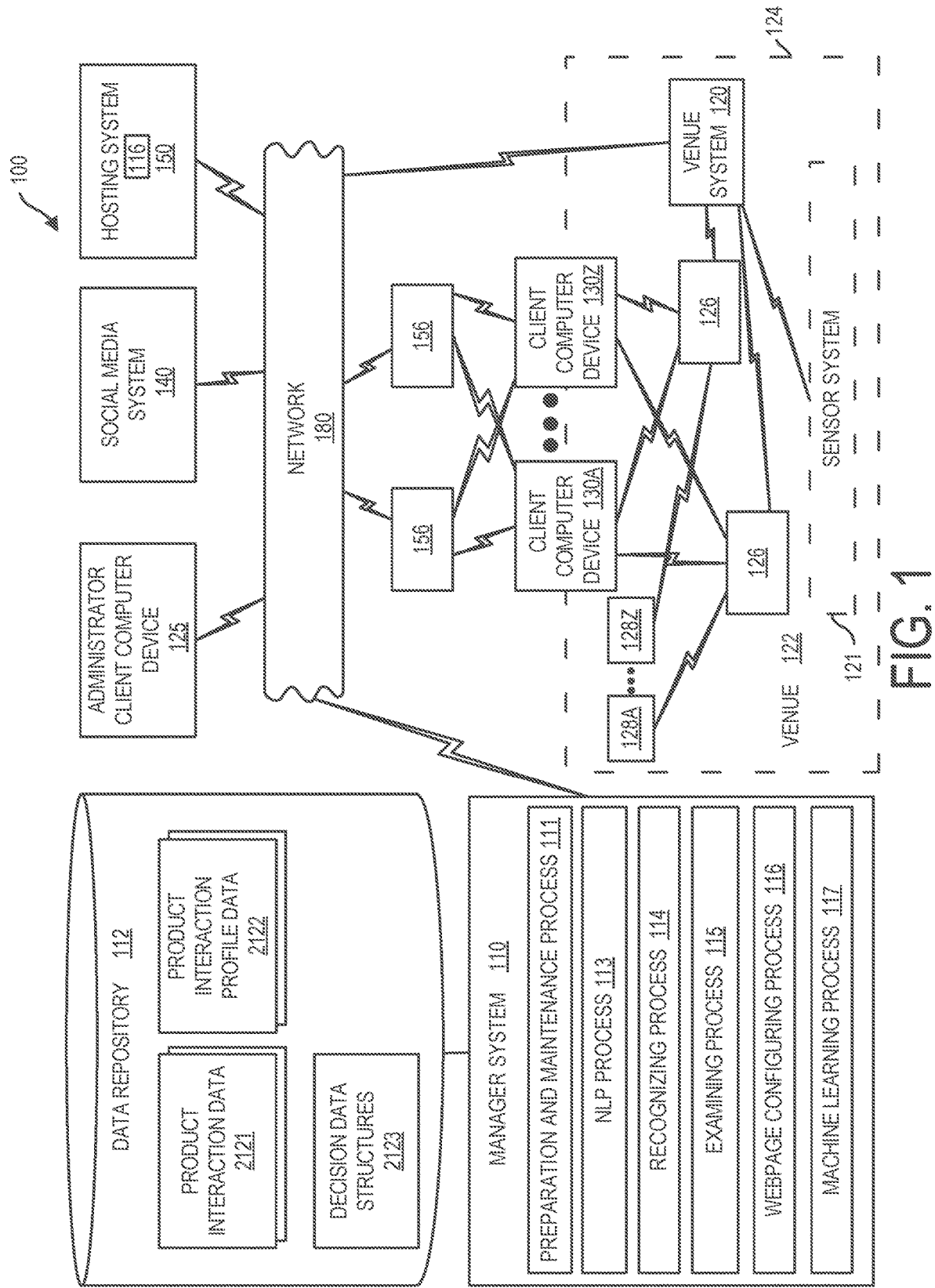
FIG. 1 depicts a system having manager system a venue system and computer devices according to one embodiment.

System 100 for determining and using product interactions is shown in FIG. 1. System 100 can include manager system 110 having an associated data repository 112, client computer devices 130A-130Z, venue system 120, administrator client computer device 125, social media system 140, and hosting system 150 which can be connected to and in communication with one another via network 180, which can include one or more of a physical network or a virtual network. Venue system 120 can be disposed in a venue 122 delimited by spatial geographical border 124.

Client computer devices 130A-130Z can be in communication with network 180, e.g. via connecting nodes 156 and/or connecting nodes 126 which connecting nodes 126 can be in communication with venue system 120 which in turn is in communication with network 180. Connecting nodes 156 can be e.g. connecting nodes of a cellular service wide area network (WAN), connecting nodes 126 can be connecting nodes of a wireless local area network (WLAN). System 100 can include numerous devices, which may be computing node based devices, connected by network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

Manager system 110 can determine a current location of client computer devices 130A-130Z employing various locating technologies, e.g. based on radio signals obtained by connecting nodes 156 and/or connecting nodes 126. Within venue 122, there can be disposed one or more sensor system 121 in communication with venue system 120 and in turn with network 180. One or more sensor system 121 can be, e.g. a video camera system which obtains video data of various locations, e.g. in one embodiment comprising an entirety of a patron floor space of venue 122 and which in one embodiment can include additionally or alternatively video cameras disposed in each shopping cart within a venue 122. One or more sensor system 121 can also in one embodiment include, e.g. an RFID sensor system for tracking RFID product disposed within venue 122.

Within venue 122 there can also be disposed a plurality of products 128A-128Z which are interacted with by patron users having associated client computer devices 130A-130Z. Products 128A-128Z in one embodiment can be absent of electronics but in one embodiment products of the plurality of products 128A-128Z can be Internet of Things (IoT) enabled products which sense interactions thereto and which are capable of reporting interaction data based on interactions with users. In one embodiment products of the plurality of products 128A-128Z can be provided by "e-fabric" products. Products 128A in one embodiment can be e.g. any department store or grocery store products.

In one embodiment, manager system 110 can be external to and remote from venue system 120 social media system 140, administrator client computer device 125, and to each of the one or more client computer device 130A-130Z for use by users of system 100. In one embodiment manager system 110 can be co-located with venue system 120 and/or social media system 140. In one embodiment manager system 110 can be co-located with administrator client computer device 125, and/or one or more client computer device 130A-130Z. Administrator client computer device 125 can be used by human administrator users of system 100. Client computer devices 130A-130Z can be used by human users of system 100.

Referring further to FIG. 1, venue system 120 can be located in venue 122 that is delimited by venue geographical border 124 that specifies the geographical coordinate area occupied by venue 122. In one embodiment, an organizational enterprise that operates manager system 110 can be in common with the organizational enterprise that operates venue system 120 and venue 122. Venue 122 can be a retail venue in one embodiment. Venue system 120 can be disposed in venue 122 defined by geographical boundary 124. Client computer devices 130A-130Z can be mobile computer devices, moveable between locations, internal and external to venue 122, and thus are shown in FIG. 1 as being partially disposed within geographical boundary 124 and partially disposed external to geographical boundary 124. Client computer devices 130A-130Z can be wireless computer devices that can be connected to network 180 by alternate radio communication protocols. For example, client computer devices 130A-130Z can connect to network 180 by connection nodes 156. Connection nodes 156 can be connection nodes that facilitate connection to a cellular communication network. Client computer devices 130A-130Z can also be connected to network 180 via connection nodes 126. Connection nodes 126 can be provided by IEEE 802.11 access points of a WiFi wireless network provided by an operator of venue system 120, in which operator can be the operator of venue 122 and manager system 110. Client computer devices 130A-130Z can be provided e.g., by smartphones and/or smartwatches.

Each of the different users of client computer devices 130A-130Z can be associated to a different user. A client computer device of one or more user computer device 130A-130Z, in one embodiment can be a computing node based device provided by a client computer, e.g. a mobile device, e.g. a smartphone or tablet, a laptop, smartwatch, or PC that runs one or more program e.g., including a web browser for viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Manager system 110 can run various processes. For example, manager system 110 can run preparation and maintenance process 111, natural language processing (NLP) process 113, recognizing process 114, examining process 115, webpage configuring process 116, and machine learning process 117. Data repository 112 can store in product interaction data area 2121 interaction data received from various resources and from various venues. In product interaction profile data area 2122, data repository 112 can store product interaction profiles that describe user product interactions with events. Data repository 112 can include decision data structures area 2123 which can include e.g. one or more multidimensional decision table for driving one or more decision, e.g. a decision to configure a webpage based on the webpage being served to a certain user based on a product interaction profile of the certain user.

Manager system 110 can run preparation and maintenance process 111 to obtain data from various sources within system 100 and to store such data into various areas of data repository 112 such as product interaction data area 2122 and/or product interaction profile data area 2123 for use by additional processes of manager system 110. Manager system 110 can run NLP process 113 to structure obtained unstructured data having language elements, e.g. typed text or spoken words. NLP process 113 can return topic and or sentiment data by processing unstructured data having a language element.

Manager system 110 running recognizing process 114 can recognize patterns in received data, e.g. users via facial recognition by way of image data processing or speech recognition. Manager system 110 can run examining process 115 to examine received product interaction data from area 2121 and to classify an interaction defined by the interaction data into one or more classification. In one embodiment, a classification provided by running of examining process 115 can be a binary classification, e.g. a classification baseline activity to designate a level of interaction below a threshold, or the classification "active" to designate activity above a threshold level. Classifications returned by running of examining process 115 can in one embodiment be non-binary and include various classifications such as "held", "read", "measured", "carried", "carted" and "questioned".

Manager system 110 can run webpage configuring process 116 to configure webpages that are configured based on a product interaction profile of a user engaged in a browsing session. Running examining process 115 manager system 110 can provide product interaction profile data. A product interaction profile can include, e.g. one or more product interaction classification and other data such as data specifying the user and the product. A product interaction profile can include in addition, data of received product interaction data for the interaction.

Figure 2:
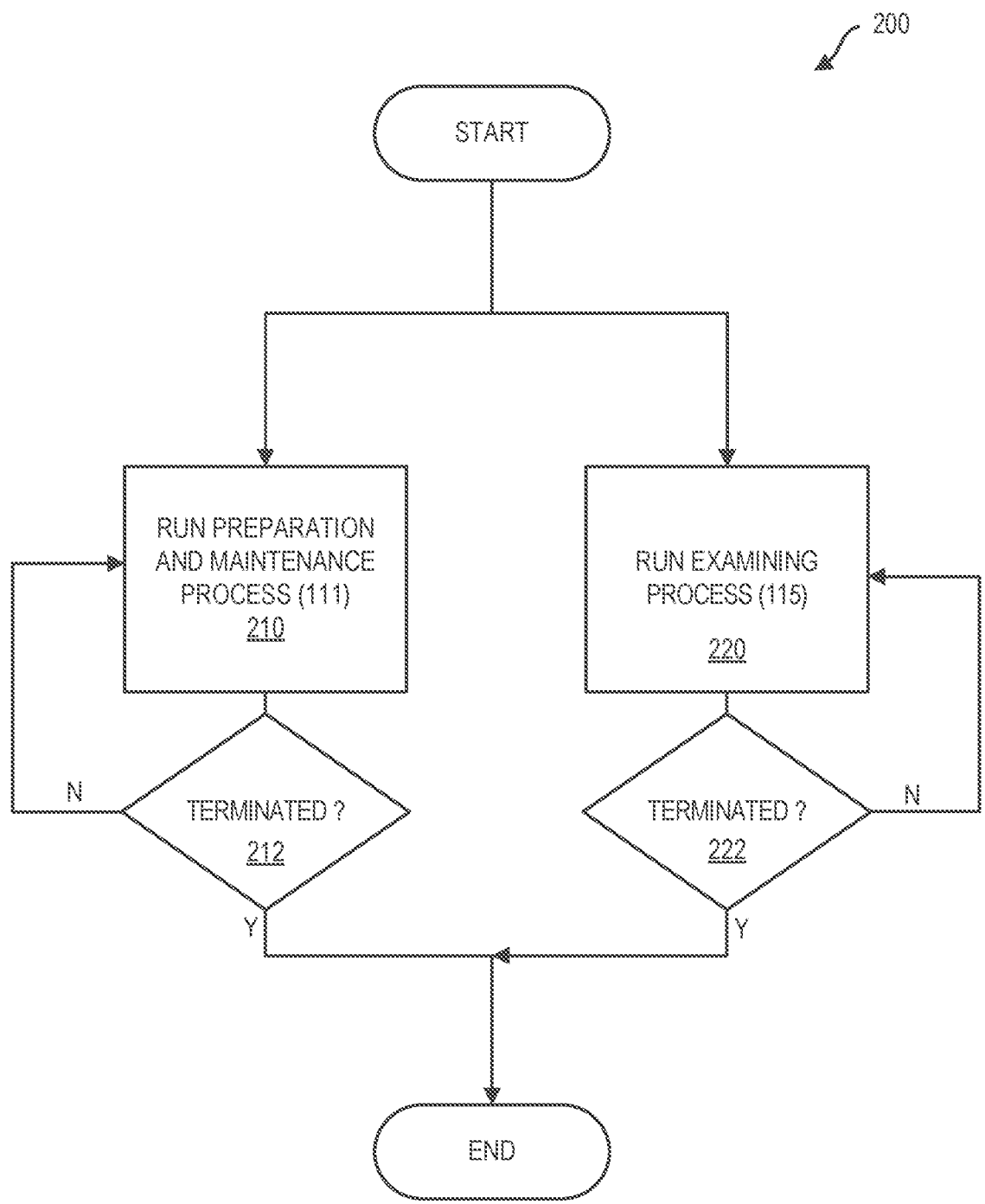
FIG. 2 is flowchart illustrating a method that can be performed by a manager system according to one embodiment.

A method 200 for performance by manager system 110 is set forth herein in reference to the flowchart of FIG. 2.

At block 210, manager system 110 can run preparation and maintenance process 111 to populate prepare and maintain various data of data repository 112 including data of product interaction data area 2121, product interaction profile data area 2122 and decision data structures area 2123. Manager system 110 can run preparation and maintenance process 111 until process 111 is terminated at block 212.

At block 220, manager system 110 can run examining process 115 to provide product interaction profile data. For support of running of examining process 115 iteratively, manager system 110 can be running e.g. NLP process 113 and recognizing process 114 iteratively. Manager system 110 can run examining process 115 until examining process 115 is terminated at block 222. Manager system 110 can run preparation and maintenance process 111 and examining process 115 concurrently and can run each of process 111 and process 115 iteratively.

For performance of preparation and maintenance process 111, manager system 110 can be configured to automatically process, e.g. including by running of NLP process 113, messages that are generated by system 100. In one embodiment manager system 110 for performance of block 210 can instantiate structured data records in areas 2121, 2122, and 2123 of data repository 112 that are adapted for use by examining process 115.

A method 300 for performance by manager system 110 is illustrated with reference to FIG. 3. At block 310 manager system 110 can perform obtaining product interaction data, the product interaction data being in dependence on a user's interaction with an item within a venue. At block 320 manager system 110 can perform examining, by machine logic, data of the product interaction data, wherein the examining includes examining of data of the product interaction data to determine that the user has interacted with the item. At block 330, manager system 110 can perform configuring, by machine logic, a webpage that specifies product information, wherein the configuring is based on the examining data of the product interaction data, and wherein the configuring is performed in response to a communication received from the user. At block 340 manager system 110 can perform sending the configured webpage to the user.

Figure 3:
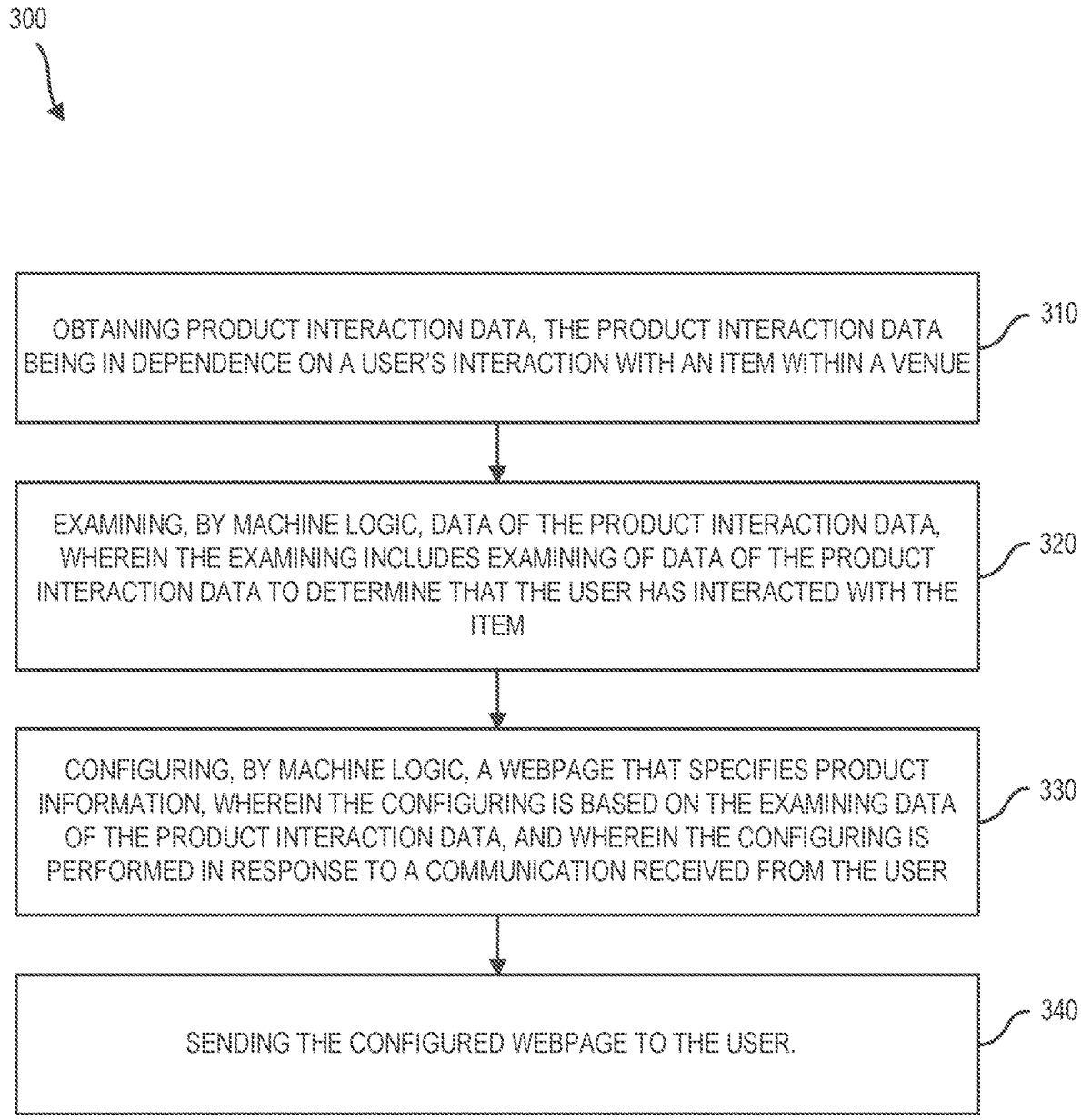
FIG. 3 is flowchart illustrating a method that can be performed by a manager system according to one embodiment.
Figure 4:
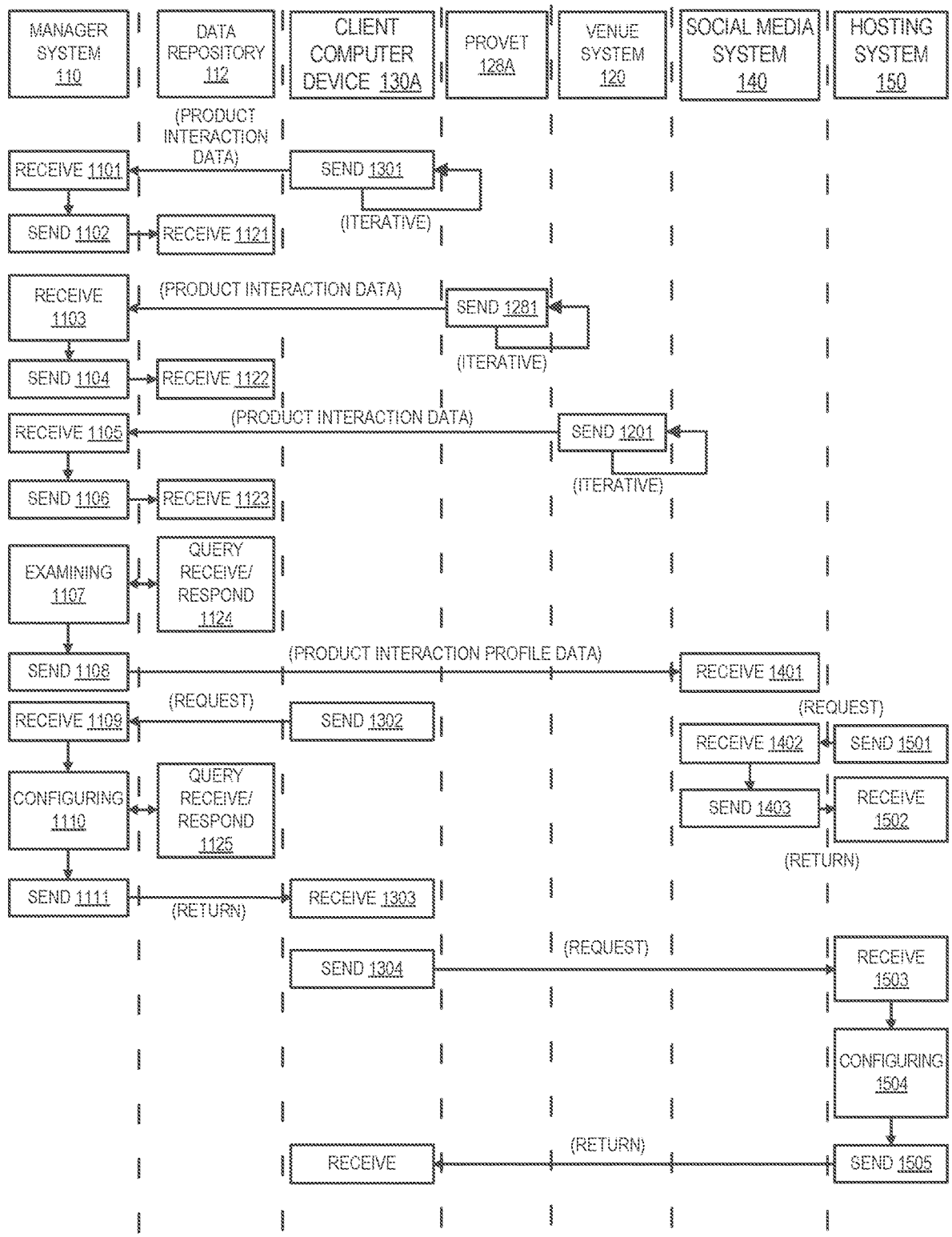
FIG. 4 is flowchart illustrating a method that can be performed by a manager system interoperating with other components according to one embodiment.

A specific example of the method set forth in the flowchart of FIG. 3 is described in the flowchart of FIG. 4 depicting operations of manager system 110, interoperating with client computer device 130A, product 128A, venue system 120, social media system 140, and hosting system 150. At blocks 1301, 1281, and 1201 one or more of client computer device 130A, product 128A, and venue system 120 can be iteratively sending product interaction data for receipt by manager system 110 at blocks 1101, 1103, and 1105 respectively. As indicated by send blocks 1102, 1104, and 1106 of manager system 110 and receive blocks 1121, 1122, and 1123 of data repository 112 manager system 110 can be storing iteratively received product interaction data into data repository 112, e.g. for storage into product interaction data area 2121.

Product interaction data can include data in dependence on a user's interaction with a product, e.g. product 128A within a venue 122. Manager system 110 running machine learning process 117 can improve the accuracy and reliability of various processes such as examining process 115 and webpage configuring process 116 based on machine learning. For example, manager system 110 running examining process 115 can classify a user's product interaction. Embodiments herein recognize that a user within a venue such as venue 122 can engage in various interactions with a product. A user may touch and feel a product, hold a product, lift a product, measure a product (attempt to determine how large or heavy a product is), read a label on a product, carry a product, or ask questions about a product to a venue agent. Product interaction data sent at one or more of blocks 1301, 1281, and 1201 can include data that is in dependence on a user's interaction with a product such as the user interactions described. Various different sources such as client computer device 130A, product 128A, and venue system 120 can send different types of product interaction data.

Client computer device 130A can include a mobile device of a user, e.g. such as a smart phone and/or a smart watch. Product interaction data sent by client computer device 130A can include, e.g. camera image video data, decoded barcode and/or RFID data specifying the product being handled, audio data, e.g. based on interactions including content of conversations between a user and a venue agent, and gesture data, e.g. as may be determined using a radio transceiver based gesture sensor (RF gesture sensor). In one embodiment, client computer device 130A can include a SOLI® sensor available from Google, Inc. (SOLI is a registered trademark of Google, Inc.).

Product 128A can send various other types of product interaction data. In one embodiment, product 128A can be provided by an IoT enabled product that is able to sense interactions therewith by a user. In one embodiment, product 128A can include touch sensitive material such as touch sensitive textile material having conductive fibers that produce an electrical signal for processing in response to touch. Product 128A having touch sensitive material can be configured to sense gestures. In one embodiment, product 128A can include touch sensitive material in accordance JACQUARD touch sensitive material (JACQUARD is a trademark of Google, Inc.).

Venue system 120 can send various other types of product interaction data. For example, venue system 120 can send obtained product interaction data obtained from one or more sensor system 121, e.g. an in venue camera sensor system, RFID sensor system, or beacon zone sensor system. In one embodiment one or more sensor system 121 can include an in venue camera video system which is able to obtain high resolution video data of locations throughout venue 122 which can be subject, e.g. to gesture recognition and facial recognition processing. In one embodiment, a venue camera system provided as part of sensor system 121 and recognizing process 114 of manager system 110 can be provided in part by an IBM WATSON® in venue camera recognition system (IBM WATSON is a registered trademark of International Business Machines Corporation). In one embodiment, a venue camera system provided as part of sensor system 121 can include shopping cart video cameras disposed in shopping carts distributed within venue 122. An RFID sensor system of one or more sensor system 121 can decode RFID tags that can be disposed on product 128A. In addition to product interaction data received by the sending at blocks 1301, 1281, and 1201 manager system 110 can obtain product interaction data in the form of location data. Location data can include location data sent by venue system 120, e.g. based on zone sensing performed by a beacon zone sensor system of one or more sensor system 121 or a WLAN based locating that is determined based on radio sensor signals received by connection nodes 126. Client computer device 130A can send location data, e.g. as provided by a GPS sensor of client computer device 130A. Based on received location data manager system 110 has knowledge of a current location of client computer device 130A and can track a movement of a client computer device 130A throughout a venue.

At block 1107, manager system 110 can perform examining of received product interaction data received, e.g. at blocks 1101, 1103, and 1105. Examining at block 1107 can include in one embodiment examining received product interaction data to classify a user's interaction with the product into one or more classification. In one embodiment, such a classification can include a binary classification, e.g. manager system 110 at block 1107 can classify a user's interaction with a product as being "inactive" or "active". Various logic can be employed for the binary classifications of "baseline" or "active". For example, a product interaction can be determined to have graduated into an active state e.g. by a user making physical contact with a product and/or a user's interaction with a product exceeding predetermined period of time. In another embodiment, the logic can be established so that the active classification is triggered after a user physically contacts a product for a predetermined period of time. In one embodiment manager system 110 can perform more granular classifications. For example, manager system 110 at block 1107 can classify a user's interaction with a product into one of a plurality of different granular nonbinary classifications e.g. classifications of "held", "read", "carried", "carted" and "questioned". Further descriptions of these classifications and aspects of product interaction data that can yield the various classifications is summarized herein below in Table 1.

TABLE 1

| Interaction Classification | Description | Exemplary Data Processing |
|---|---|---|
| Held | User manually holds a product | e.g. can be detected based on processing of camera image data provided by processing of touch indicating data obtained from product 128A or by camera image data processing obtained from venue system 120. |
| Read | User reads a product label | e.g. video camera image data obtained, e.g. from client computer device 130A and/or venue system 120 can be processed to recognize that a user is reading a product label. A product label reading gesture can also be detected, e.g. with use of data obtained from a gesture detection sensor of client computer device 130A. |
| Measured | User measures a product | e.g. gesture detection processing can be performed, e.g. using video image data obtained from client computer device 130A and/or venue system 120 and/or an output of a gesture sensor of client computer device 130A. Relevant gestures may include, e.g. a "weighing" gesture by a user where a user lifts a product up and down in the air to estimate its weight or an "sizing" gesture by a user where a user holds the users hands out with palms in parallel opposing spaced relation. |
| Carried | User carries a product | e.g. video camera image data obtained e.g. from client computer device 130A and/or venue system 120 can be processed to make a determination of classification under the carried classification. Camera video image data can be cross referenced to location data obtained from a location service, e.g. location data can be obtained from client computer device 130A and/or venue system 120, and/or another source. |
| Carted | User places product in a shopping cart | e.g. video camera image data obtained e.g. from client computer device 130A and/or venue system 120 can be processed to make a determination of classification under the carted classification. An in-store video camera system can include in-shopping cart video cameras in one embodiment. |
| Questioned | User asks a question about a product | e.g. audio data from client computer device 130A can be processed to determine that a user has spoken to a venue agent about a product. |

Manager system 110 in one embodiment can determine a user's predicted interest level in a product (e.g. the interacted with product and/or a product of the product category of the interacted with product) based on the determined classification information. In one embodiment one or more decision data structure of decision data structure area 2123 can include cognitive mapping logic for use by manager system 110 that cognitively maps determined classifications to predicted interest levels. For example, using one or more decision data structure of decision data structure of area 2123 manager system 110 can assign a predicted interest level of "1" to product interactions resulting in an "baseline" activity classification, can assign a higher predicted interest level of "2" to product interactions resulting in an "active"

classification and zero of the nonbinary classifications held, read, measured, carried, carted, and questioned, can assign a higher predicted interest level of "3" to product interactions resulting in an "active" classification and one (1) of the nonbinary classifications held, read, measured, carried, carted, and questioned, can assign a higher predicted interest level of "4" to product interactions resulting in an "active" classification and two (2) of the nonbinary classifications held, read, measured, carried, carted, and questioned, can assign a higher predicted interest level of "5" to product interactions resulting in an "active" classification and three (3) of the nonbinary classifications held, read, measured, carried, carted, and questioned, and so on.

In the performing of examining block 1107, manager system 110 can provide product interaction profile data, for storing into product interaction profile data area 2122 of data repository 112. Product interaction profile data provided by manager system 110 at block 1107 specifying product interaction data for a certain product interaction event can include various data. Product interaction profile data can include e.g. the determined classification information determined by the examining at block 1107 as well as data specifying the product and data specifying the user interacting with the product and or timing data of the interaction event (e.g. the start time and stop time). In addition, product interaction profile data can include, e.g. product interaction data, e.g. data from the data set from which classification is performed for purposes of facilitating alternative classification by a downstream process. The provided product interaction profile can also include location data of the interaction event, which can include substantially a single location, e.g. where a user remains stationary when interacting with a product or a set of locations, e.g. where a user carries a product from a first location to a second location. Data of a provided product interaction profile can be formatted into machine processable form, e.g. can be provided in a processable markup language document format, e.g. XML or JSON. Data of the markup language file can include e.g. product information, user identifying information, timing information specifying e.g. an interaction event start and stop time, and classifying information specifying a classification of the activity of the user during an interaction with the item.

Various processes can be implemented for the determining of a product identifier associated to a product interaction profile. For example, a client computer device can include an encoded dataform reader and can decode product identifying data of a product. Client computer device 130A can include for example, barcode reading functionality, RFID reading functionality, and/or a product recognition functionality. Data output by product 128A can include a signature and therefore an identifier of product 128A. Venue system 120 which can be in communication with various sensor systems of one or more sensor system 121 such as a video camera imaging system for imaging internal space of venue 122 and a venue implemented RFID reading system can also provide data indicating a product identifier, e.g. including data processable to decode an identifier e.g. barcode or RFID based or including decoded data specifying a product identifier.

Various processes can be used to associate a product interaction profile for an event to a user. For example, client computer device 130A can be running in accordance with an application having a subscriber login and accordingly, data output by client computer device 130A can be data that includes an associated user identifier. System 100 for example, can also or alternatively be configured to cross-reference the location of a certain client computer device 130A with a user of the client computer device 130A, e.g. by facial recognition to therefore determine that data of client computer device 130A is data from a device being used by the certain user. Data output by product 128A and venue system 120 can also include indicators of the user. For example, touch representing data produced by product 128A can be processed to determine that the touch data is associated to signature characteristic touch data of a certain user and therefore can determine that the certain user has interacted with the product. Venue system 120 can output video camera data that can be processed by manager system 110, e g running recognizing process 114 for determining e.g. via facial recognition that a certain user is interacting with a certain product.

In some embodiments, manager system 110 at block 1108 in response to completing examining at block 1107 can send product interaction profile data to social media system 140 for receipt by social media system 140 at block 1401. The sending at block 1108 can include sending the product interaction profile data to an external computing node based data storage location (e.g. social media system 140) external to a computing node base system, e.g. manager system 110 performing the examining at block 1107. so that the product interaction profile data can be accessed by computing node based systems (e.g. hosting system 150) external to a computing node base system, e.g. manager system 110 performing the examining at block 1107.

At block 1109, manager system 110 can receive a request for a product webpage from a user. As indicated by the flowchart of FIG. 4, client computer device 130A can send a request for a product webpage to manager system 110 for receipt by manager system 110 at block 1109. The user of client computer device 130A can initiate sending of a request for webpage at block 1302 after the user using the client computer device 130A has exited venue 122 and is at another location, e.g. at home or at the office, or any other location. The interaction depicted at block 1302 and block 1109 references a web browsing session in which a user looks up information regarding one or more products available at venue 122. In one embodiment, manager system 110 can be operated by an enterprise that operates venue 122 and can serve webpages that provide information on products and transaction mechanisms for acquisition of products by users.

In the flowchart of FIG. 4 it is depicted that a user of client computer device 130A initiates a web browsing session using client computer device 130A of the user. However, it is understood that the user may initiate the web browsing session indicated at blocks 1302 and 1109 using another client computer device of the user, e.g. the web browsing can be initiated using a home PC whereas the prior operations depicted as being performed by client computer device 130A can be operations of a mobile device such as a smartphone and/or a smart watch carried by the user inside a venue, e.g. venue 122. At block 1110, manager system 110 can perform configuring a webpage to return to the user in response to the user's request received at block 1109.

Manager system 110 on performing the configuring at block 1110 can configure a webpage for sending to a user based on product interaction profile data of the user. On receipt of a request at block 1109 manager system 110 can examine data of product interaction profile data area 2122 to identify data that specified the current user making the request. The identification of the current user can be performed in various ways; e.g. the IP address or MAC address of the user can be recognized and/or the request data may be tagged with login ID which the user has entered to commence the browsing session. Product interaction profile data of the user can be data of a single product interaction event or of multiple product interaction events. In one embodiment, manager system 110 can configure a webpage for sending to a user based on interaction classification (e.g. baseline, active, held, read, measured, carried, carted, and/or questioned) performed by the examining at block 1107.

Initially, in one embodiment, manager system 110 can confirm that a current browsing session relates to a product, for which there is a product interaction profile. For example, manager system 110 can perform a match between a product category of a product of a browsing session and a product category of a product interaction profile. Based on a matching being identified, manager system 110 can configure a webpage to provide a reminder as to the product interacted with at the venue and/or based on the product interacted with at the venue can provide indications recommending additional products related to the product interacted with at the venue. In another embodiment, manager system 110 configures a webpage for presentment to a user based on product interaction profile data of the user irrespective of a product of a current browsing session of the user, e.g., can present information of a prior in venue visit regardless of the product on the current browsing session.

Manager system 110 for configuring a webpage at block 1110 can incorporate an examination of product interaction profile data into an "products you make like" algorithm run by manager system 110. In configuring a webpage, manager system 110 can run a "product you make like" algorithm in which various data of the user is examined such as purchase history and website browsing history of the user. At block 1110 in accordance with embodiments set forth herein additional data is examined in the performance of a "products you make like" algorithm. For example, on identification of a user, manager system 110 can look up product interaction profiles data of product interaction profile data area 2122 to determine a prior one or more certain product interacted with by a user. Manager system 110 can then configure a webpage based on the prior one or more certain product, e.g. can configure the one or more webpage to present the prior one or more certain product as product(s) the user may be interested in. Manager system 110 alternatively or additionally can determine a product category of the one or more certain product e.g. using table lookup and can configure a webpage to present at least one product of a common product category with the one or more certain prior product. In one embodiment, manager system 110 can proceed with special configuration of a webpage (e.g. having features described with reference to areas 502, 502A, 510, 520, 530, and 540 of FIGS. 5A and 5B) based on a determination that prior interaction with a product was classified an "active" interaction which determination can be made e.g. based on one or more of a product being physically touched and/or the product being interacted with for more than a threshold period of time. In one embodiment, manager system can proceed with special configuration of a webpage (e.g. having features described with reference to areas 502, 502A, 510, 520, 530, and 540 of FIGS. 5A and 5B) based on a determination that prior interaction with a product was classified as being a "baseline" activity level interaction Manager system 110 can configure a webpage to be particularly configured based on particular classifications of a product interaction profile. For example, based on "read" classification being observed, manager system 110 can configure a webpage to include additional product specification information, e.g. can include a link to a product specification. The additional product specification details can be details that are normally suppressed in the absence of the "read" classification. The additional specification information can be provided in relation to the product initially browsed by the user at the venue or a product related to the initial product or both. According to another example, based on a "measured" classification being observed, manager system 110 can highlight measurement specifications of a product that are normally suppressed in the absence of the "measured" classification. For example, can prominently display such information as "the product is 3 feet long and weighs 27 pounds." Where a "questioned" classification is observed, manager system 110 can present a prompt, otherwise suppressed in the absence of the "questioned" classification, that prompts a user to contact a representative of the enterprise operating venue 122. The "questioned" classification can indicate that the user is particularly amenable to interacting with establishment agents.

Manager system 110 for performing each of examining block 1107 and configuring block 1110 can perform multiple queries of data repository 112 which as indicated by blocks 1124 and 1125 are received and responded to by data repository 112.

At block 1111, manager system 110 can return a configured webpage to the user according to the configuration determined at block 1110. The returned webpage can be a user interface webpage. The configured webpage can be received by a client computer device 130A at block 1303.

Figure 5A:
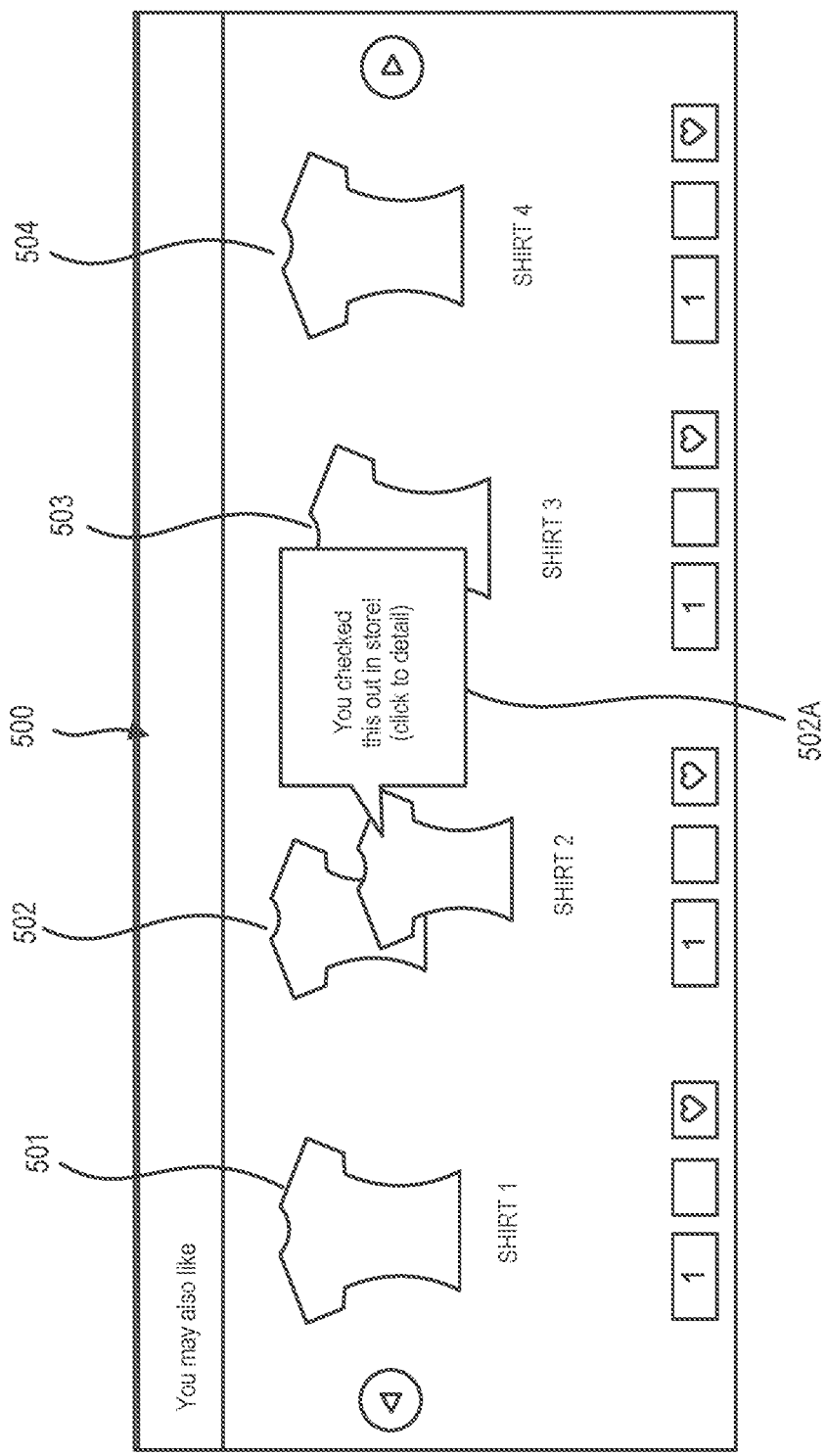
FIG. 5A depicts a webpage configured based on product interaction profile data according to one embodiment.
Figure 5B:
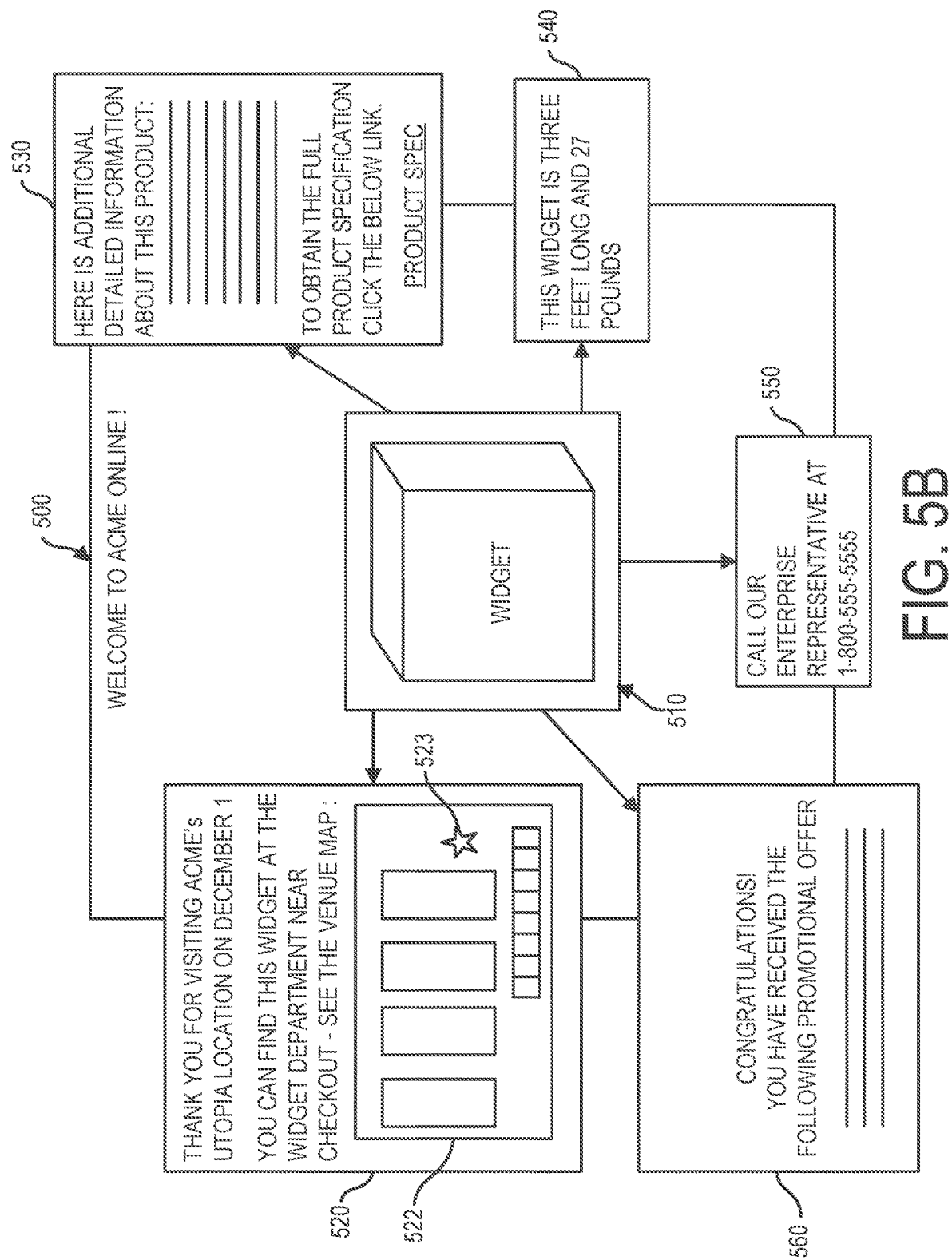
FIG. 5B depicts a webpage configured based on product interaction profile data according to one embodiment.

Aspects of exemplary returned webpages configured in accordance with configuring block 1110 are described in reference to FIGS. 5A and 5B. The example of 5A depicts functionality wherein data of a product interactions profiles data is used as an input to an "products you make like" algorithm. In FIG. 5A there is shown a displayed webpage 500 configured according to the configuring at block 1110. In areas 501, 502, 503, and 504 there can be displayed products identified by running a "products you may like" algorithm. The product of area 502 is a product identified based on examination of data of product interaction profile data of product interaction profile data area 2122, and with the indicator of area 502A is presented with special notation. The special notation can be e.g. information that the user interacted with the product or a common product category at a specific venue at a specific time. As indicated in area 502A webpage 500 can be configured to provide a venue map (example shown in FIG. 5B) depicting where in a venue the product depicted can be found.

In FIG. 5B there is shown a displayed webpage 500 configured according to the configuring at block 1110. Webpage 500 can include area 510 depicting a widget, such as a boxed widget. The widget depicted in area 510 can be, e.g. a product browsed for by the user during a current session or unrelated to a current browsing session. Area 510 can display a representation of the product interacted with at the venue 122 as specified at in product interaction profile data. In another embodiment, area 510 depicts a representation of a product determined to be related, e.g. by product category matching either or both to a product of a current browsing session or a product of a product interaction event as specified in product interaction profile data. In area 520, webpage 500 can include augmented information reminding the user of the user's visit to a particular venue in which the user interacted with the product or a similar product. If the actual product interacted with is represented in area 510, area 520 can specify such information.

Area 520 can include indicators where the user can find the product depicted in area 510 within venue 122 and can include in area 522 a venue map indicating a specific location 523 in which the displayed product of area 510 can be found in the venue. Webpage 500 can display, in areas 530, 540, and 550, specialized information that is normally suppressed, and is displayed on a specialized basis based on a certain classification being observed. Based on the "read" classification being observed webpage 500 can display in area 530 information specifying additional information on the product depicted in area 510 including access, e.g. to a full product specification. In area 540, webpage 500 based on a "measured" classification being observed can display information highlighting measurements of the product depicted in area 510, e.g. dimensional, e.g. height, width, length, and/or weight information. In area 550, webpage 500 can display based on a "questioned" classification being observed, a prompt prompting a user to call an enterprise representative. The interactions between client computer device 130A and manager system 110 at blocks 1302 and 1303 and blocks 1109-1111 can be associated to an embodiment in which manager system 110 is operated by an enterprise that operates venue 122 and also serves webpages about products that are provided within venue 122. In another area of configured webpage 500, manager system 110 based on a "carted" classification being observed can display an image obtained from a shopping cart video camera of venue 122 depicting a product interacted with during an interaction in a state resulting in a "carted" classification.

Regarding configured webpage 500 of FIG. 5A and configured webpage 500 of FIG. 5B the content of a configured webpage can be based on a predicted interest level of a user which interest level can be determined e.g. using a decision data structure of data structure area 2123 in a manner set forth herein. For example, in some embodiments, enablement of the specialized configuration features can be based on a qualifying predicted interest level (e.g. of 1 or 2 or higher). In some instances content that is presented can be scaled based on the predicted interest level of the user. For example, in one embodiment areas 520, 530, 540, 550, 560 can represent different windows or popup areas each with differentiated content and in one embodiment, a count of windows or popup areas presented can be restricted to a count proportional to the user's predicted interest level (more windows or popup areas are presented to users who are more interested). In area 560 of FIG. 5B a configured webpage 500 configured by the configuring at block 1110 can present a product promotional offer. In one embodiment, manager system 110 can configure the parameters of the product promotional offer (products, monetary amounts, expiration etc.) based on the user's determined predicted interest level. The promotion can be a promotion that is predicted to result in the user purchasing a product referenced in the promotion based on one or more classification of a product interaction.

In one embodiment, system 100 can be configured so that manager system 110 provides product interaction profile data in a manner that product interaction profile data can be accessed by hosting system 150. Hosting system 150 can be a system external to manager system 110, e.g. can be logically external and/or physically external and can be operated by an enterprise other than an enterprise operating manager system 110 and/or venue 122. In one embodiment, hosting system 150 and venue 122 are operated by a common enterprise and manager system 110 is operated by an enterprise that provides a service to the enterprise operating hosting system 150 and venue 122.

In one particular embodiment, manager system 110 provides a service to an enterprise operating venue 122 and hosting system 150 performs examining process 115 based exclusively on data obtained within venue 122 by client computer device 130A, e.g. based on data provided by gesture sensors, video camera image sensors, and location sensors of client computer device 130A. In such an embodiment, a user of client computer device 130A can offer and provide product interaction information to various enterprises without manager system 110 accessing data obtained from sensors operated by an establishment operating operates venue 122.

Embodiments herein recognize that it may be advantageous to configure system 110 so that client computer devices 130A-130Z can provide interaction profile data via manager system 110 to hosting system 150 based exclusively on data obtained using client computer devices 130A-130Z and not using any data obtained from any sensor operated by an establishment operating venue 122. Manager system 110 may provide a service to individual users whereby the individual users can provide their interaction product profile data to enterprises and it may be advantageous to streamline such a service so that the service is not dependent on obtaining data from venue operated sensors. According to such a service manager system 110 can be configured to that in response to a user using computer device 130 entering defining configuration data to initiate a product interaction profile data post, manager system 110 posts the product interaction data to social media system 140 where it can be accessed by hosting system 140 as set forth herein.

Regarding an embodiment facilitating specialized webpage configuring by hosting system 150, manager system 110 at block 1108 is sent product interaction profile data determined by the examining at block 1107 for receipt by social media system 140 at block 1401. On receipt of product interaction profile data at block 1401, social media system 140 can post the product interaction profile data for access by various enterprises. At block 1501, hosting system 150 can request the product interaction profile data and such a request can be received by social media system 140 at block 1402. Social media system 140 at block 1403 can send the requested product interaction profile data to hosting system 150 for receipt by hosting system at block 1502. Hosting system 150 at block 1502 accordingly, is configured to perform configuring of specialized webpages to users based on analysis of product interaction profile data. Hosting system 150 in one embodiment can run webpage configuring process 116 as set forth in reference to FIG. 1 and block 1110 of the flowchart of FIG. 4. At block 1304, a user using client computer device 130A can initiate a browsing session to browse products on a website hosted by hosting system 150. Client computer device 130A at block 1304 can request a webpage, such request can be received by hosting system 150 at block 1503. Based on the receipt of the request at block 1503, hosting system 150 can perform configuring at block 1504. The configuring at block 1504 by hosting system 150 can be in accordance with the configuring performed by manager system 110 described in reference to block 1110.

At block 1505, hosting system 150 can return a configured webpage configured by the configuring at block 1504. Client computer device 130A can receive the configured webpage and can display the received configured webpage in accordance with the description provided in reference to FIGS. 4 and 5A and 5B.

Manager system 110 can run machine learning process 117 to improve the reliability and accuracy of processes run by manager system 110. According to one example of machine learning, manager system 110 can iteratively update data of data repository 112 to increase a corpus of data within data repository. As the corpus of data grows, confidence levels associated to determinations made by manager system 110 can increase, thus increasing decision firing conditions and capacities over time of manager system 110 with iterative data updates and corpus data growth.

One example of machine learning that can be implemented by manager system 110, pertains to operations of examining process 115. In reference to Table 2, manager system 110 can perform examining of data and perform classifications of interactions. In some use cases, the confidence level associated with the determination of the classification can be correlated with and based upon a data source used for providing data that is processed for a determination.

TABLE 2

| Classification Process | Source | Confidence Level | Result |
|---|---|---|---|
| Process 1 | HD Camera | 0.90 | "Measured" |
| Process 2 | RF Gesture Sensor | Less than a threshold | "Held" |
| Process 3 | RF Gesture Sensor | Less than a threshold | "Measured" |
| Process 4 | RF Gesture Sensor | Less than a threshold | "Read" |

According to Table 2, manager system 110 can be configured to run four processes for classifying a product interaction. The first process in the described example can involve processing of data from an HD camera source, e.g. of one or more sensor system 121 installed within venue 122 and can have a high confidence level, e.g. 90% in the described example. The result of the classification can be the classification of "measured" as set forth herein. Classification processes 2-4 are classification processes involving processes of data output by an RF gesture sensor of client computer device 130A. Classification processes 2, 3, and 4 can be alternative processes employing different algorithms. Classification processes 2, 3, and 4 can have low confidence levels below a threshold suitable for use in triggering. However, based on machine learning processes that can be employed by manager system 110, manager system 110 throughout examining processes set forth herein can compare classifications performed by various processes. In the described example, described with reference to Table 2, manager system 110 can determine that a classification result, i.e. the result of "measured" is produced commonly by classification process 1 having a confidence level above a threshold and classification process 3 having a confidence level of less than a threshold. Based on the classification results being the same and based on the high confidence level associated with process 1, manager system 110 according to a machine learning process herein can increase an associated confidence level associated to classification process 3. Therefore, an examining process performed by manager system 110 is trained and improved by machine learning process. For a next iteration, data output by the HD camera source relied upon by classification process 1 might not be available. However, because a confidence level associated with classification process 3 has been increased, the classification produced by classification process 3 may have a confidence level of such that it can be relied upon for classification.

Another example of machine learning that can be performed by operation of machine learning process 117 is described in reference to Table 3.

TABLE 3

| User | Product Category | Product Interaction Classification | Webpage Configuration Process |
|---|---|---|---|
| 001 | A | "Read"; "Measured" | "a" |
| 001 | B | "Read" | "b" |
| 001 | B | "Carried" | "c" |
| 001 | A | "Read" | "d" |

Table 3 describes a decision data structure that can be stored in decision data structures area 2123. Table 3 sets forth a decision table for use in configuring webpages for sending to users, e.g. webpages as described in connection with FIGS. 5A and 5B. An employed decision table can be a multidimensional decision table requiring multiple conditions for a decision to be triggered. Table 3 sets forth that certain webpage process decisions can be driven based on conditions, wherein the conditions involve product interaction classifications. In one embodiment, a decision table such as the decision table of Table 2 can be configured to be iteratively updated over time by machine learning. For example, each time a webpage is configured and presented, the result of the presentment is monitored. For example, if a configured and presented webpage did not induce the action prompted for the designated webpage process can be updated to designate an alternative process. With reference to Table 3, if for example, the webpage configured according to webpage configuration process "a" does not result in the intended action of the user being induced, manager system 110 can automatically update the row entry to designate a new webpage configuration process, e.g. process "d". Manager system 110 can also monitor for actions by a user in relation to a webpage that is not prompted for and can provide a decision table, such as the decision table of Table 3 so that designated webpage configuration processes specify actions in accordance with the actions that have occurred without prompt. Machine learning can be employed to improve content of a decision data structure that maps product interaction classifications to user interactive presentments to users.

Certain embodiments herein may offer various technical computing advantages, involving computing advantages to address problems arising in the realm of computer networks and particularly computer networks operating to provide services to a plurality of users capable of communicating with the network. Embodiments herein feature examination and classification of user physical interactions with products, and use information of physical interactions to predict user preferences. Embodiments herein feature computer networks that interactively respond to physical interactions of users with products. One fundamental aspect of computer networks is their interactions with interfaces which can include human interfaces, and embodiment herein can improve human interfacing operations of computer networks. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence (AI) platforms, and machine learning platforms. Embodiments herein can employ data structuring processes, e.g. employing Natural Language Processing (NLP) and recognition processing for transforming unstructured data into a form optimized for computerized processing. Embodiments herein can examine data from diverse data sources such as data sources of mobile devices, products, and venues including data sources that process radio signals for location determination of users or for gesture determination. Embodiments herein can include artificial intelligence (AI) processing platforms featuring improved processes to transform unstructured data into structured form permitting computer based analytics and predictive decision making. Embodiments herein can include particular arrangements for both collecting rich data into a data repository and additional particular arrangements for updating such data and for use of that data including by machine learning to drive artificial intelligence decision making.

Figure 6:
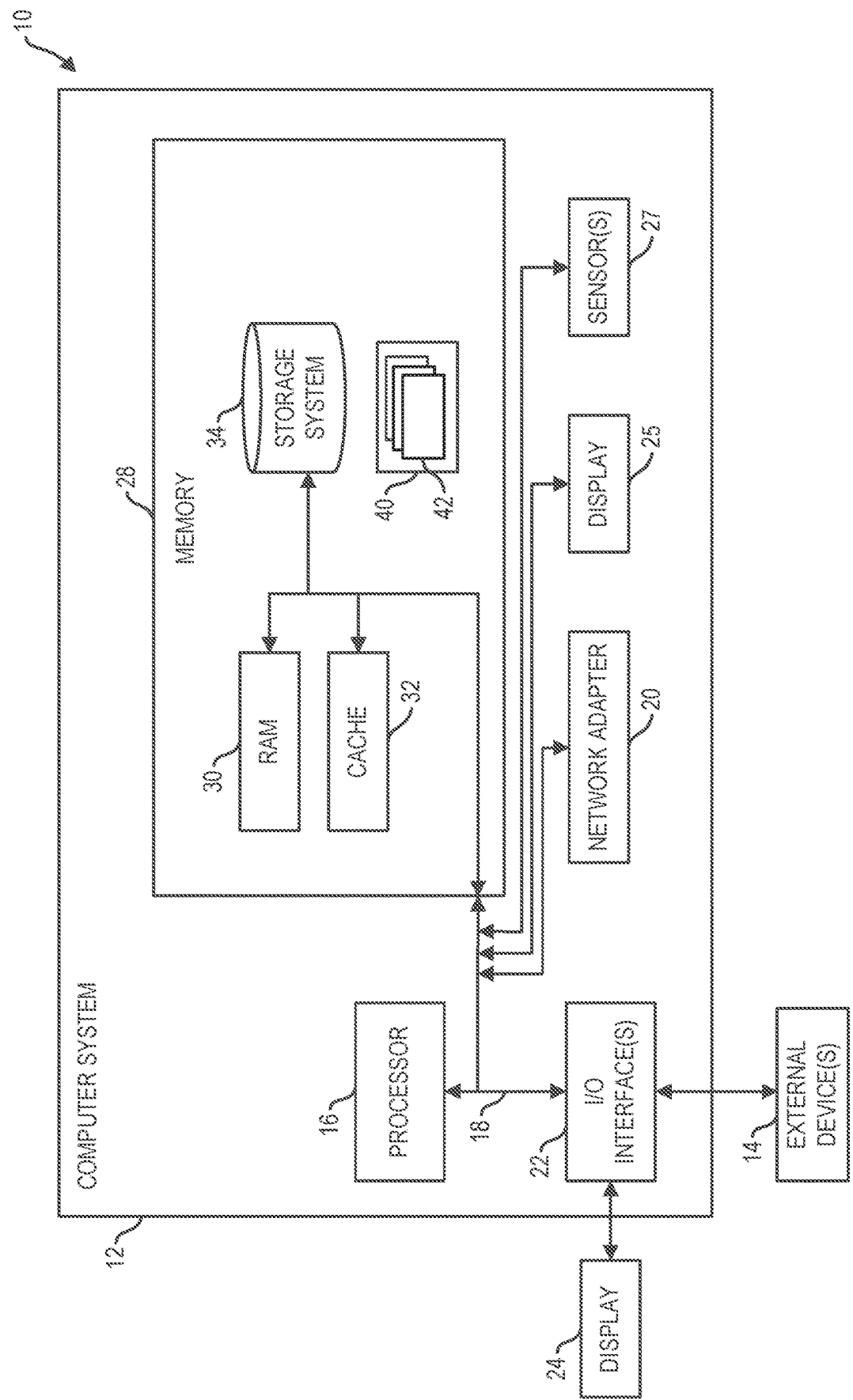
FIG. 6 depicts a computing node according to one embodiment.
Figure 7:
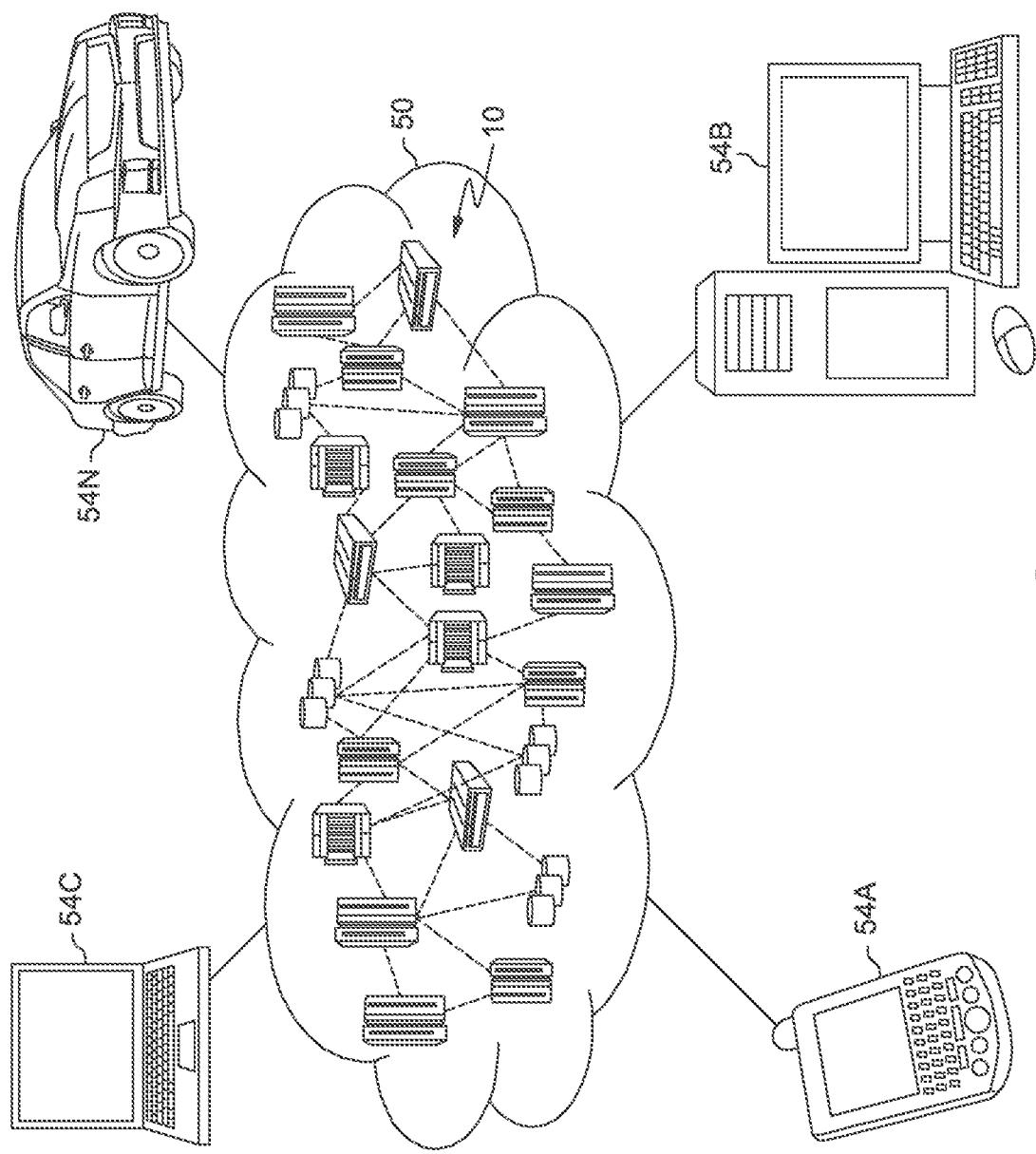
FIG. 7 depicts a cloud computing environment according to one embodiment.
Figure 8:
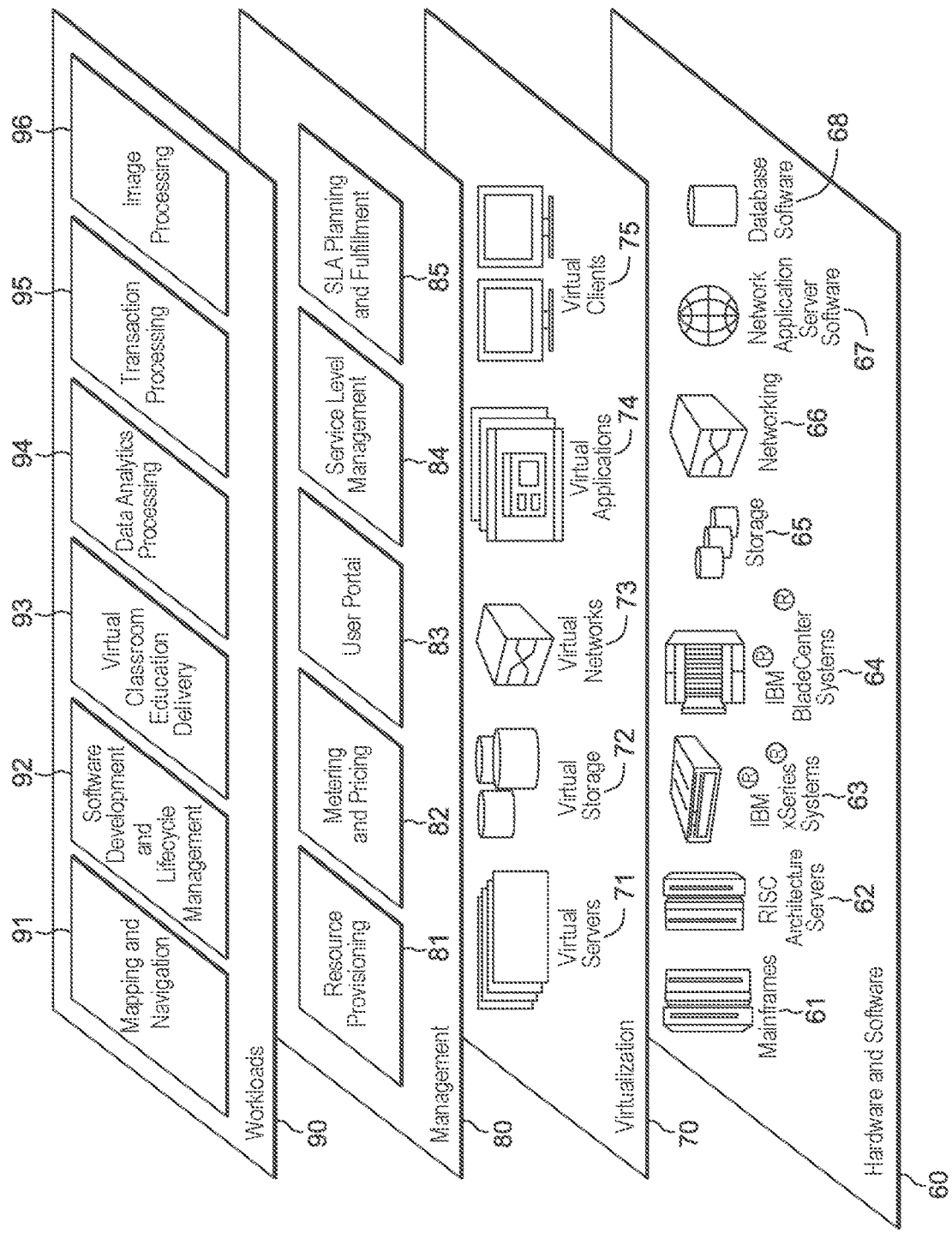
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and method 300 of FIG. 3 and functions described with reference to manager system 110 as set forth in the flowchart of FIG. 4. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, venue system 120 can include one or more computing node 10 and can include one or more program 40 for performing functions described with reference to one or more venue system 120 as set forth in the flowchart of FIG. 4. In one embodiment, hosting system 150 can include one or more computing node 10 and can include one or more program 40 for performing functions described with reference to hosting system 150 as set forth in the flowchart of FIG. 4. In one embodiment, the various computing node based devices and systems of FIG. 1 can include one or more program 40 for performing their associated described functionalities. Functions described as being performed by one or more program 40 define functions performed by programmed machine logic.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a gesture sensor such as an RF gesture sensor as set forth herein, a temperature sensor, a humidity sensor, a pulse sensor, a heartrate sensor, a blood pressure (bp) sensor or an audio input sensor. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for product interaction processing as set forth herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining sensor output data defining product physical interaction data, the product physical interaction data being in dependence on a user's physical interaction with an item within a venue;
   examining data of the product physical interaction data, wherein the examining includes examining of data of the product physical interaction data to determine that the user has interacted with the item;
   receiving, by a website hosting system, a webpage request from the user, the webpage request being received during a web browsing session of the user;

responsively to the receiving of the webpage request, configuring in dependence on the user's physical interaction with the item, by the website hosting system, a user interface webpage that specifies product information related to the item, wherein the configuring is in dependence on interaction data of the product physical interaction data;

obtaining sensor output data defining second product physical interaction data, the second product physical interaction data being in dependence on a second user's physical interaction with an in venue item in common with the item;

performing examining data of the second product physical interaction data, wherein the performing examining includes examining of data of the second product physical interaction data to determine that the second user has physically interacted with the in venue item;

receiving, by the website hosting system, a second webpage request from a second user, the second webpage request being received during a web browsing session of the second user;

responsively to the receiving of the second webpage request, performing configuring in dependence on the second user's physical interaction with the in venue item, by the website hosting system, a second user interface webpage that specifies product information related to the in venue item, wherein the performing configuring is in dependence on interaction data of the second product physical interaction data; and sending the configured second webpage to the second user, wherein the second webpage is configured differently from the webpage in dependence on a difference between (a) a physical interaction by the user with the item, and (b) a physical interaction by the second user with the in venue item.

2. The method of claim 1, wherein the method includes:
storing product interaction data into a data repository responsively to the examining, the product interaction data associating the user to the item and an interaction classification;
storing second product interaction data into the data repository responsively to the performing examining, the second product interaction data associating the second user to the in venue item and a second interaction classification.

3. The method of claim 1, wherein the method includes:
storing product interaction data into a data repository responsively to the examining, the product interaction data associating the user to the item and an interaction classification;
storing second product interaction data into the data repository responsively to the performing examining, the second product interaction data associating the second user to the in venue item and a second interaction classification;
wherein the method includes, responsively to the receiving of the webpage request, identifying the product interaction data stored in the data repository in dependence on an identifier of the user, and performing the configuring of the webpage in dependence on the interaction classification associated to the user in the stored product interaction data.

4. The method of claim 1, wherein the method includes:
storing product interaction data into a data repository responsively to the examining, the product interaction data associating the user to the item and an interaction classification;
storing second product interaction data into the data repository responsively to the performing examining, the second product interaction data associating the second user to the in venue item and a second interaction classification;
wherein the method includes, responsively to the receiving of the webpage request, identifying the product interaction data stored in the data repository in dependence on an identifier of the user, and performing the configuring of the webpage in dependence on the interaction classification associated to the user in the stored product interaction data; and
wherein the method includes, responsively to the receiving of the second webpage request, identifying the second product interaction data stored in the data repository in dependence on an identifier of the second user, and carrying out the performing configuring of the second webpage in dependence on the second interaction classification associated to the second user in the second stored product interaction data.

5. The method of claim 1, wherein the method includes:
storing product interaction data into a data repository responsively to the examining, the product interaction data associating the user to the item and an interaction classification;
storing second product interaction data into the data repository responsively to the performing examining, the second product interaction data associating the second user to the in venue item and a second interaction classification;
wherein the method includes, responsively to the receiving of the webpage request, identifying the product interaction data stored in the data repository in dependence on an identifier of the user, and performing the configuring of the webpage in dependence on the interaction classification associated to the user in the stored product interaction data;
wherein the method includes, responsively to the receiving of the second webpage request, identifying the second product interaction data stored in the data repository in dependence on an identifier of the second user, and carrying out the performing configuring of the second webpage in dependence on the second interaction classification associated to the second user in the second stored product interaction data;
wherein the obtaining the sensor output data defining product physical interaction data includes performing the obtaining the sensor output data defining product physical interaction data using an arrangement of one or more sensor; and
wherein the obtaining the sensor output data defining the second product physical interaction data includes performing the sensor output data defining obtaining the second product physical interaction data using an arrangement of at least one sensor.

6. The method of claim 1, wherein the configuring the webpage is performing in dependence on a classification of the user's physical interaction with the item, the classification of the user's physical interaction with the item determined by processing interaction data of the product physical interaction data, and wherein the performing the configuring of the second webpage is carried out in dependence on a classification of the second user's physical interaction with the in venue item, wherein the classification of the second user's physical interaction with the in venue item is determined by processing interaction data of the second product physical interaction data.

7. The method of claim 1, wherein the second product physical interaction data is in dependence on a second user's physical interaction with the in venue item with the in venue item being within the venue.

8. A method comprising:
obtaining product interaction data, the product interaction data being in dependence on a user's interaction with an item within a venue;
examining data of the product interaction data, wherein the examining includes examining of data of the product interaction data to determine that the user has interacted with the item;
configuring a webpage that specifies product information, wherein the configuring is based on the examining data of the product interaction data, and wherein the configuring is performed in response to a communication received from the user, wherein the communication received from the user is a request for a webpage specifying a certain product, wherein the configuring is performed in response to a determination that a category of the item subject to physical interaction with by the user is of a category of the certain product, wherein the configuring is performed so that a count of popup windows on the configured webpage and content within the popup windows are in dependence on characteristics of the user's physical interaction with the item within the venue.

9. A method comprising:
obtaining product interaction data, the product interaction data being in dependence on a user's interaction with an item within a venue;
examining data of the product interaction data, wherein the examining includes examining of data of the product interaction data to determine that the user has interacted with the item;
configuring a webpage that specifies product information, wherein the configuring is based on the examining data of the product interaction data, and wherein the configuring is performed in response to a communication received from the user, wherein the method is further characterized by one or more of the following selected from the group consisting of (I) wherein the examining data of the product interaction data includes examining data to determine whether an interaction of the user belongs to a "read" classification, the "read" classification being indicated by a reading gesture of the user in the venue and wherein the examining data of the product interaction data includes examining data to determine whether an interaction of the user belongs to a "measured" classification, the "measured" classification being indicated by a measuring gesture of the user in the venue, wherein the configuring a webpage that specifies product information includes providing the configured webpage to provide first normally suppressed data based on the "read" classification being observed, and second normally suppressed data based on the "measured" classification being observed, (II) wherein the examining data of the product interaction data includes examining data to determine whether an interaction of the user belongs to a first classification, the first classification being indicated by a first gesture of the user in the venue and wherein the examining data of the product interaction data includes examining data to determine whether an interaction of the user belongs to a second classification, the second classification being indicated by a second gesture of the user in the venue, wherein the configuring a webpage that specifies product information includes providing the configured webpage to provide first normally suppressed data based on the first classification being observed, and second normally suppressed data based on the second classification being observed; (III) wherein the examining data of the product interaction data includes examining data to determine that a product interaction of the user belongs to one or more of classification selected from the group consisting of (a) baseline, (b) active), (c) held, (d) read, (e) measured, (f) carried, (g) carted, and (h) questioned, and wherein the configuring is based on the classification, wherein the examining data of the product interaction data includes examining data of the product interaction data to determine a predicted interest level of the user in the product, wherein examining data of the product interaction data to determine a predicted interest includes using a decision data structure that cognitively maps classifications of product interactions with predicted interest levels, and wherein the configuring is based on the predicted interested level so that content of configured webpage is expanded or restricted or expanded based on the determined predicted interest level, wherein the examining data of the product interaction data includes examining data of the product interaction data to provide a markup language file specifying information on the user's interaction with the item, wherein the information includes, product information, user identifying information, timing information specifying timing information, and classifying information specifying a classification of the activity of the user during an interaction with the item, and wherein the method includes posting the markup language data file to an external location external from a computing node based system performing the examining, and wherein the configuring a webpage that specifies product information, is performed by a hosting system external to the computing node based system performing the examining; and (IV) wherein the examining data of the product interaction data includes examining data of the product interaction data to determine a predicted interest level of the user in the product, wherein examining data of the product interaction data to determine a predicted interest includes using a decision data structure that cognitively maps classifications of product interactions with predicted interest levels, and wherein the configuring is based on the predicted interested level so that content of configured webpage is expanded or restricted or expanded based on the determined predicted interest level, wherein the item comprises a touch sensitive material that produces an electrical signal available for processing in response to touch and wherein the obtaining product interaction data includes obtaining product interaction data from the item.

10. The method of claim 9, wherein the method is further characterized by the following: the examining data of the product interaction data includes examining data to determine whether an interaction of the user belongs to a "read" classification, the "read" classification being indicated by a reading gesture of the user in the venue and wherein the examining data of the product interaction data includes examining data to determine whether an interaction of the user belongs to a "measured" classification, the "measured" classification being indicated by a measuring gesture of the user in the venue, wherein the configuring a webpage that specifies product information includes providing the configured webpage to provide first normally suppressed data based on the "read" classification being observed, and second normally suppressed data based on the "measured" classification being observed.

11. The method of claim 9, wherein the method is further characterized by the following: the examining data of the product interaction data includes examining data to determine whether an interaction of the user belongs to a first classification, the first classification being indicated by a first gesture of the user in the venue and wherein the examining data of the product interaction data includes examining data to determine whether an interaction of the user belongs to a second classification, the second classification being indicated by a second gesture of the user in the venue, wherein the configuring a webpage that specifies product information includes providing the configured webpage to provide first normally suppressed data based on the first classification being observed, and second normally suppressed data based on the second classification being observed.

12. The method of claim 9, wherein the method is further characterized by the following: the examining data of the product interaction data includes examining data to determine that a product interaction of the user belongs to one or more of classification selected from the group consisting of (a) baseline, (b) active), (c) held, (d) read, (e) measured, (f) carried, (g) carted, and (h) questioned, and wherein the configuring is based on the classification, wherein the examining data of the product interaction data includes examining data of the product interaction data to determine a predicted interest level of the user in the product, wherein examining data of the product interaction data to determine a predicted interest includes using a decision data structure that cognitively maps classifications of product interactions with predicted interest levels, and wherein the configuring is based on the predicted interested level so that content of configured webpage is expanded or restricted or expanded based on the determined predicted interest level, wherein the examining data of the product interaction data includes examining data of the product interaction data to provide a markup language file specifying information on the user's interaction with the item, wherein the information includes, product information, user identifying information, timing information specifying timing information, and classifying information specifying a classification of the activity of the user during an interaction with the item, and wherein the method includes posting the markup language data file to an external location external from a computing node based system performing the examining, and wherein the configuring a webpage that specifies product information, is performed by a hosting system external to the computing node based system performing the examining.

13. The method of claim 9, wherein the method is further characterized by the following: the examining data of the product interaction data includes examining data of the product interaction data to determine a predicted interest level of the user in the product, wherein examining data of the product interaction data to determine a predicted interest includes using a decision data structure that cognitively maps classifications of product interactions with predicted interest levels, and wherein the configuring is based on the predicted interested level so that content of configured webpage is expanded or restricted or expanded based on the determined predicted interest level, wherein the item comprises a touch sensitive material that produces an electrical signal available for processing in response to touch and wherein the obtaining product interaction data includes obtaining product interaction data from the item.

* * * * *